(12) United States Patent
Gallart Mauri et al.

(10) Patent No.: US 11,804,234 B2
(45) Date of Patent: Oct. 31, 2023

(54) METHOD FOR ENHANCING TELEPHONE SPEECH SIGNALS BASED ON CONVOLUTIONAL NEURAL NETWORKS

(71) Applicant: SYSTEM ONE NOC & DEVELOPMENT SOLUTIONS, S.A., Saragossa (ES)

(72) Inventors: Javier Gallart Mauri, Saragossa (ES); Iñigo Garcia Morte, Saragossa (ES); Dayana Ribas Gonzalez, Saragossa (ES); Antonio Miguel Artiaga, Saragossa (ES); Alfonso Ortega Gimenez, Saragossa (ES); Eduardo Lleida Solano, Saragossa (ES)

(73) Assignee: SYSTEM ONE NOC & DEVELOPMENT SOLUTIONS, S.A., Sargossa (ES)

( * ) Notice: Subject to any disclaimer, the term of this patent is extended or adjusted under 35 U.S.C. 154(b) by 334 days.

(21) Appl. No.: 17/124,794

(22) Filed: Dec. 17, 2020

(65) Prior Publication Data
US 2021/0256988 A1 Aug. 19, 2021

(30) Foreign Application Priority Data
Feb. 14, 2020 (EP) .................................... 20382110

(51) Int. Cl.
*G10L 21/0232* (2013.01)
*G06N 3/04* (2023.01)
(Continued)

(52) U.S. Cl.
CPC ............ *G10L 21/0232* (2013.01); *G06N 3/04* (2013.01); *G06N 3/08* (2013.01); *G10L 15/16* (2013.01);
(Continued)

(58) Field of Classification Search
None
See application file for complete search history.

(56) References Cited

U.S. PATENT DOCUMENTS

2019/0132687 A1\* 5/2019 Santos .................... H04R 25/50
2019/0318755 A1\* 10/2019 Tashev ................... G06N 3/045
(Continued)

OTHER PUBLICATIONS

"Kawase, Application of Neural Network to Source PSD Estimation for Wiener Filter Based Array Sound Source Enhancement, 2016, IEEE International Workshop on Acoustic Signal Enhancement, pp. 1-5" (Year: 2016).\*

(Continued)

*Primary Examiner* — Jonathan C Kim
*Assistant Examiner* — Jonathan Ernesto Amaya Hernandez
(74) *Attorney, Agent, or Firm* — The Webb Law Firm

(57) ABSTRACT

A method for enhancing telephone speech signals based on Deep Convolutional Neural Network (CNN) is disclosed. The method is able to reduce the effect of acoustic distortions in daily scenarios during a telephone call. It is a single-channel, speech-oriented method with causal design and low latency. The novelty lies in the noise reduction method which, based on the classical gain method, uses a CNN to learn the Wiener estimator. Then, it computes the gain of the filter to enhance the speech power over the noise power for each time-frequency component of the signal. The selection of the Wiener gain estimator as an essential element of the method, decreases the vulnerability to estimation errors since the characteristics of this measure make it very appropriate to be estimated by deep learning approaches.

9 Claims, 1 Drawing Sheet

(51) Int. Cl.
G06N 3/08 (2023.01)
G10L 25/18 (2013.01)
G10L 25/21 (2013.01)
G10L 25/24 (2013.01)
G10L 25/30 (2013.01)
G10L 25/60 (2013.01)
G10L 25/78 (2013.01)
G10L 15/16 (2006.01)

(52) U.S. Cl.
CPC .............. *G10L 25/18* (2013.01); *G10L 25/21* (2013.01); *G10L 25/24* (2013.01); *G10L 25/30* (2013.01); *G10L 25/60* (2013.01); *G10L 25/78* (2013.01)

(56) References Cited

U.S. PATENT DOCUMENTS

2019/0341067 A1* 11/2019 Rajendran ............... G10L 25/30
2020/0227070 A1* 7/2020 Kim ........................ G10L 25/30

OTHER PUBLICATIONS

"T. Kawase, K. Niwa, K. Kobayashi and Y. Hioka, "Application of neural network to source PSD estimation for wiener filter based array sound source enhancement," 2016 IEEE International Workshop on Acoustic Signal Enhancement (IWAENC), Xi'an, China, 2016, pp. 1-5, doi: 10.1109/IWAENC.2016.7602949." (Year: 2016).*
Boll, "Suppression of Acoustic Noise in Speech Using Spectral Subtraction", IEEE Transactions on Acoustics, Speech, and Signal Processing, Apr. 1979, pp. 113-120, vol. 27:2.
Cohen et al., "Speech enhancement for non-stationary noise environments", Signal Processing, 2001, pp. 2403-2418, vol. 81.
Ephraim et al., "Speech Enhancement Using a Minimum Mean-Square Error Log-Spectral Amplitude Estimator", IEEE Transactions on Acoustics, Speech, and Signal Processing, Apr. 1985, pp. 443-445, vol. 33:2.
Ephraim et al., "Speech Enhancement Using a Minimum Mean-Square Error Short-Time Spectral Amplitude Estimator", IEEE Transactions on Acoustics, Speech, and Signal Processing, Dec. 1984, pp. 1109-1121, vol. 32:6.
Goehring et al., "Speech enhancement based on neural networks improves speech intelligibility in noise for cochlear implant users", Hearing Research, 2017, pp. 183-194, vol. 344.
Healy et al., "An algorithm to increase speech intelligibility for hearing-impaired listeners in novel segments of the same noise type", The Journal of the Acoustical Society of America, Sep. 2015, pp. 1660-1669, vol. 138:3.
Loizou, "Speech Enhancement: Theory and Practice", CRC Press, New York, 2013, 199 pages.
Narayanan et al., "Ideal Ratio Mask Estimation Using Deep Neural Networks for Robust Speech Recognition", IEEE International Conference on Acoustic, Speech and Signal Processing (ICASSP), 2013, pp. 7092-7096.
Wiener, "Extrapolation, Interpolation, and Smoothing of Stationary Time Series", The M.I.T. Press, Mar. 1949, 29 pages.
Xia et al., "Speech Enhancement with Weighted Denoising Auto-Encoder", Interspeech, Aug. 2013, pp. 3444-3448.
Xiang et al., "Speech Enhancement Based on Cepstral Mapping and Deep Neural Networks", IEEE 4th International Conference on Computer and Communications, 2018, pp. 1263-1267.

* cited by examiner

METHOD FOR ENHANCING TELEPHONE SPEECH SIGNALS BASED ON CONVOLUTIONAL NEURAL NETWORKS

CROSS-REFERENCE TO RELATED APPLICATION

This application claims priority to European Patent Application No. 20382110.3 filed Feb. 14, 2020, the disclosure of which is hereby incorporated by reference in its entirety.

BACKGROUND OF THE INVENTION

The present method for enhancing telephone speech signals based on Deep Convolutional Neural Network (CNN) is able to reduce the effect of acoustic distortions which occur in daily scenarios during a telephone call. These distortions can be manifested in the form of additive noise, reverberation or others, and can affect the intelligibility of the speech that is transmitted by the telephone line, causing discomfort between the callers or even causing them to abandon the conversation. The present invention is a method for enhancing single-channel telephone speech signals with low latency. The novelty of the method of the present invention lies in the fact that it is a noise reduction method which, based on the classical gain method, uses a Deep Convolutional Neural Network (CNN) to learn the Wiener estimator. Then, with this it computes the gain of the filter to enhance the speech power over the noise power for each time-frequency component of the signal. The selection of the Wiener gain estimator as an essential element of the method, decreases the vulnerability to estimation errors since the characteristics of this measure make it very appropriate to be estimated by deep learning approaches. The method of the present invention may optionally incorporate the ability to evaluate the quality of the speech signal and, accordingly, proceed to apply the acoustic enhancement.

Compared to previous studies, the present invention manages to significantly improve efficiency, enables the processing of realistic noises (non-stationary, mixed, correlated with speech, etc.), and also improves in the fact that the estimation is performed in a non-recursive manner, which prevents errors from being propagated. It enables two modes of operation, one based on causal processing, suitable for applications which require real-time analysis and environments which require causality, as well as one which makes use of the complete signal in a non-causal manner for applications with requirements that enable it. Finally, it is emphasized that the method consists of an implementation which implies low latency in the processing.

FIELD OF THE INVENTION

The invention belongs to the field of telecommunications technology, and more specifically to those technologies which enable acoustic distortions in telephone speech to be reduced.

DESCRIPTION OF RELATED ART

Telephone conversations which take place in everyday scenarios, for example, at home, in an office, a public park, a street, etc., are mostly affected by environmental noise, reverberating effects which usually occur when using a hands-free device in an indoor setting, a distant microphone, among others. These acoustic distortions are combined with the speech and are transmitted as a whole through the telephone line. In this manner, the intelligibility of the speech which reaches the other end is compromised according to the level of affectation of the speech signal. Moderate levels of distortion can cause discomfort for the speakers involved in the conversation. However, as the level of affectation of the signal increases, the callers may even consider ending the call. The use of a method for enhancing speech contributes to the repetition of these undesirable situations not affecting the quality of the service and thus improving the reputation of the telephone service provider.

These methods are capable of processing speech signals with distortions typical of real environments, offering a signal with better acoustic quality. The method for enhancing speech in the spectral domain based on gain is an established paradigm for reducing noise in single-channel speech signals (Philipos C. Loizou, Speech Enhancement: Theory and Practice, CRC Press, New York, 2013). The gain method consists of obtaining a time-frequency representation of the speech signal and estimating a gain dependent on the frequency and which varies in time, according to the level of noise affectation of each spectral area. This gain is used to modify the time-frequency components of the spectral representation of the signal according to the predominance of speech or noise, which is determined by the speech presence probability. The application of the enhancement filter on the time-frequency representation of the speech signal gives rise to a modified version of the spectrum which approaches the clean speech signal. Then a reconstruction algorithm applies an inverse transformation, in accordance with the one used initially, in order to obtain the samples of the enhanced signal in the time domain.

In the state of the art, there is a large family of statistical algorithms derived from this paradigm. Among them it is essential to mention classical Wiener filtering (Norbert Wiener. "*Extrapolation, Interpolation, and Smoothing of Stationary Time Series*". New York: Wiley. ISBN 978-0-262-73005-1, 1949) and Spectral Subtraction (S. Boll, "*Suppression of acoustic noise in speech using spectral subtraction*" *IEEE Trans. on Acoustic, Speech and Signal Processing*, vol. 27, no. 2, pp. 113-120, 1979), plus the numerous variants thereof; the Estimator of the Short-Time Spectral Amplitude (STSA) (Y. Ephraim and D. Malah, "*Speech enhancement using a minimum-mean square error short-time spectral amplitude estimator*" *IEEE Trans. on Acoustic, Speech and Signal Processing*, vol. 32, no. 6, pp. 1109-1121, 1984) and the evolution thereof, the Estimator of the Logarithmic Spectral Amplitude (LSA) (Y. Ephraim and D. Malah, "*Speech enhancement using minimum-mean square log spectral amplitude estimator*" *IEEE Trans. on Acoustic, Speech and Signal Processing*, vol. 33, no. 2, pp. 443-445, 1985), which have also been an inspiration for numerous proposals, for example the Estimator of the Optimally-Modified Logarithmic Spectral Amplitude (OMLSA) (I. Cohen and B. Berdugo, "*Speech enhancement for non-stationary noise environments*" *Signal Processing*, vol. 81, no. 11, pp. 2403-2418, 2001), among others. However, the statistical basis of this framework has limitations on the effectiveness of the internal estimates of the method, especially when faced with real noise environments which may have mixtures of noise types, impulsive noises, noise correlated with speech, etc.

The resurgence of deep machine learning has influenced classical noise reduction techniques. In general, single-channel speech enhancement based on deep neural networks is divided into two fundamental trends: mask learning or mask approximation-based techniques, and feature mapping or signal approximation-based techniques. However, the gain method is maintained as the underlying paradigm in both cases.

Previous studies in the context related to the proposal, i.e., the methods for enhancing single-channel speech using deep neural networks (DNN) and mask-based methods, differ both by the application context of the method they propose, as well as by the essence of the novelty they pose.

The state of the art fundamental to the present invention is made up of:

B. Y. Xia and C.-C. Bao, "*Speech enhancement with weighted denoising auto-encoder,*" in Proc. Interspeech, 2013: which proposed estimating the spectrum of the clean speech signal by using an Autoencoder DNN and then continuing with the recursive estimation process to obtain the speech enhancement filter. This was a preliminary approximation of the gain method to the deep learning. However, the context of the noise reduction method in general notably differed from this proposal. In Xia et al. the DNN was only used to estimate the clean speech signal, which is an intermediate step in obtaining the Wiener gain, while in the present invention the DNN directly estimates the Wiener gain. Then, in Xia et al. the following elements which make up the framework of the classical gain method were maintained intact, which enabled them to obtain very modest improvements in the results.

Moreover, several studies have been based on developing a solution from the point of view of Computational Auditory Scene Analysis (CASA). These have focused on estimating the Ideal Binary Mask (IBM) or Ideal Ratio Mask (IRM). The definition of these masks resembles the Wiener gain estimator, but is not exactly the same. Mathematically, the IRM is defined more generically than the Wiener gain, enabling variations in the implementation thereof.

A. Narayanan and D. L. Wang, "*Ideal ratio mask estimation using deep neural networks for robust speech recognition*" in IEEE International Conference on Acoustic, Speech and Signal Processing (ICASSP), 2013, pp. 7092-7096: the DNN estimates a variant which implements the instantaneous SNR starting from the IRM, moving away from the Wiener gain estimate. Then, the time-frequency representation of the modified signal is delivered to a speech recognition system, and the signal enhancement is never reconstructed.

E. W. Healy, S. E. Yoho, J. Chen, Y. Wang, and D. Wang, "*An algorithm to increase speech intelligibility for hearing-impaired listeners in novel segments of the same noise type*", The Journal of the Acoustical Society of America, vol. 138, no. 3, pp. 1660-1669, 2015: This method estimates the square root of the IRM, while in "Tobias Goehring, F. Bolner, J. J. Monaghan, B. van Dijk, A. Zarowski, and S. Bleeck, "*Speech enhancement based on neural networks improves speech intelligibility in noise for cochlear implant users*", The Journal of Hearing research, vol. 344, pp. 183-194, 2017", the IRM is directly estimated. Unlike the invention, these methods work in the field of hearing aids, for which reason the resulting signal after the treatment passes directly to the hearing aid device and, therefore, is never reconstructed.

SUMMARY OF THE INVENTION

In a first aspect of the invention, a method for enhancing telephone speech signals based on Convolutional Neural Networks is disclosed. The method of the present invention is applied to a telephone speech signal made up of magnitude and spectral phase. The method comprises the following stages:

a pre-processing stage which comprises extracting the magnitude and the phase of the spectral representation of the telephone speech signal;

a noise reduction stage which comprises applying the following steps to the magnitude of the spectral representation of the telephone speech signal:

applying a spectral estimator;

computing a perceptual representation;

applying a Convolutional Neural Network which, with inputs corresponding to the spectral estimate and the perceptual representation, generates as an output a Wiener gain estimate consisting of a matrix/vector dependent on the frequency and which varies in time;

using the Wiener gain estimate within the gain of the enhancement filter of the following function (function f1):

$$G_{filtro}(t, f) = \left[\hat{G}_{Wiener}(t, f) \exp\left(\frac{1}{2}\int_{v(t,f)}^{\infty} \frac{e^{-t}}{t} dt\right)\right]^{p(t,f)} G_{min}^{1-p(t,f)}$$

wherein t is the time segment, f is the frequency bin, $\hat{G}_{Wiener}$=DNN($x_t, x_{t-1}, \ldots$) with $x_t$ the vector of spectral and perceptual parameters, $G_{min}$ is a constant, p(t,f) is the speech presence probability and $$v(t, f) = \frac{\hat{G}_{Wiener}}{1 - \hat{G}_{Wiener}};$$

and also using the Wiener gain estimate as an estimate of the speech presence probability;

applying the function defined in the previous item (function f1) as a speech enhancement filter.

a post-processing stage which comprises merging the initial phase with the magnitude enhanced in the noise reduction stage.

The Convolutional Neural Network is trained with a cost function which is the MMSE between the optimal Wiener estimator and the output of the Convolutional Neural Network defined by means of:

$$F_{coste} = \frac{1}{T}\sum_{t=1}^{T} \sum_{f=1}^{F} (G_{Wiener}(t, f) - \hat{G}_{Wiener}(t, f))^2$$

wherein $$G_{Wiener}(t, f) = \frac{S_{X(t,f)}}{S_{X(t,f)} + S_{N(t,f)}}$$

is obtained in a supervised manner, $S_{X(t,f)}$ and $S_{N(t,f)}$ respectively being the estimates of the power spectral densities of the clean speech signal and the noise.

The Convolutional Neural Network can comprise a convolutional layer which is causal (i.e., the convolutional layer only uses signal samples prior to the one being processed and not subsequent ones) and has low latency.

Additionally, the spectral estimate is obtained by using the Welch's method.

With respect to the perceptual representation, two methods are considered: a Mel scale filterbank and a representation based on Mel-frequency cepstral coefficients (MFCC).

With respect to the pre-processing stage for extracting the magnitude and the phase of the telephone speech signal, the method of the present invention can additionally comprise dividing the speech signal into overlapping segments of tens of milliseconds to which a Hamming window, Hanning window or other equivalent window is applied, and subsequently a Fourier transform.

With respect to the pre-processing stage for extracting the magnitude and the phase of the telephone speech signal, said stage can additionally comprise objectively evaluating the quality of the speech signal by using an acoustic quality measure selected from SNR (Signal-to-Noise Ratio), distortion, POLQA (Perceptual Objective Listening Quality Analysis), or another equivalent, and depending on this result proceeding to the acoustic enhancement or not.

With respect to the post-processing stage for merging the phase obtained in the pre-processing stage with the magnitude obtained in the noise reduction stage, said stage additionally comprises applying an inverse Fourier transform, and subsequently, a temporal reconstruction algorithm of the speech signal.

In another aspect of the present invention, a system for enhancing telephone speech signals based on convolutional neural networks and configured to perform the method of the present invention defined in the first aspect of the invention is disclosed. The present invention comprises a first signal extraction block, a second signal quality evaluation block, a third speech enhancement block and a fourth speech insertion block. Thus, the first block, when a telephone call starts, proceeds to extract the speech signal from the telephone line and sends it to a parallel processing server. Next, the second block evaluates the acoustic quality of the speech segment by using a predefined acoustic quality measure, for example: SNR, distortion, POLQA, or another equivalent, and compares with a pre-established threshold according to previous studies related to the quality measure used. In this manner, the method decides whether the segment needs to be submitted to acoustic enhancement. If the decision is positive, the third block implements the method for enhancing speech of the present invention on the analyzed speech segment. If the decision is negative, it passes directly to the fourth speech insertion block which is responsible for inserting the segment of the speech signal into the telephone line, safeguarding from the appearance of cuts or other undesired effects which can affect the acoustic perception of the caller. Then, the described process is repeated and the next speech segment is analyzed.

BRIEF DESCRIPTION OF THE DRAWINGS

In order to help with a better understanding of the features of the invention and to complement this description, the following figures are attached as an integral part of the same, by way of illustration and not limitation.

DETAILED DESCRIPTION OF THE INVENTION

Acronyms:
FB: Filter Bank
MFCC: Mel Frequency Cepstral Coefficients
DNN: Deep Neural Network
CNN: Convolutional Neural Network
MMSE: Minimum Mean Square Error
SNR: Signal-to-Noise Ratio
POLQA: Perceptual Objective Listening Quality Analysis The method of the present invention is a method for enhancing speech, which may optionally include a module which analyzes the acoustic quality of the speech signal and decides whether it needs to be submitted to the acoustic enhancement process. This decision is made by means of pre-established thresholds of the quality measure. The operator may decide to make the threshold as flexible as possible, such that the enhancement process is always performed, or instead they may restrict it as much as possible such that the signal passing through the telephone line is not enhanced. These two cases of use can respond to specific applications or circumstantial situations decided by the operator. In the case of subjecting the signal to enhancement, it is then re-injected into the telephone line, showing a better acoustic quality, and in this manner it continues the path thereof to the other end.

Figure 1:
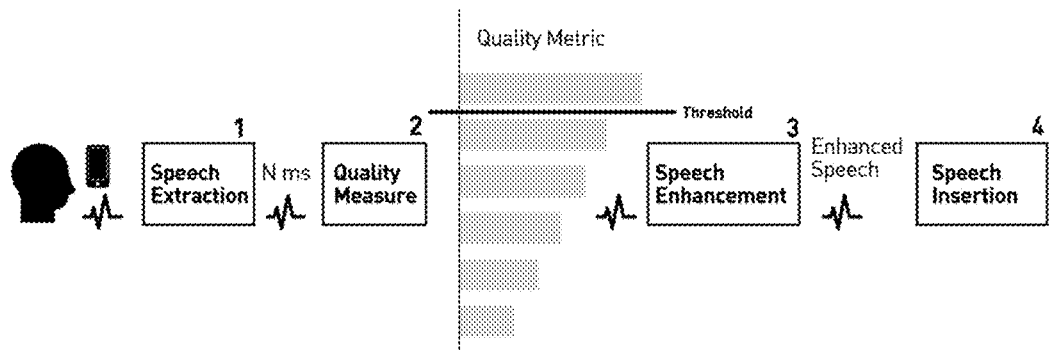
FIG. 1 shows a block diagram of the system wherein the method for enhancing the telephone speech signal is inserted.

The method of the present invention can be deployed in a system like the one shown in FIG. 1. The system shown in FIG. 1 comprises a signal extraction block 1, a signal evaluation block 2, a speech enhancement block 3 and a speech insertion block 4. Thus, the system for enhancing telephone speech signals based on convolutional neural networks of the present invention as represented in FIG. 1, when a phone call starts, proceeds to extract the speech signal 1 from the telephone line and sends it to a parallel processing server. Next, the block 2 evaluates the acoustic quality of the speech segment by using a predefined acoustic quality measure, for example: SNR, distortion, POLQA, or another equivalent, and compares with a pre-established threshold according to previous studies related to said quality measure. In this manner, the method decides whether the segment needs to be subjected to acoustic enhancement. If the decision is positive, the next block 3 implements the method for enhancing speech of the present invention on the analyzed speech segment. If the decision is negative, it passes directly to the insertion block 4 which is responsible for returning the speech segment into the telephone flow, safeguarding from the appearance of cuts or other undesired effects which can affect the acoustic perception of the caller. Then, the described process is repeated and the next speech segment is analyzed.

The present invention consists of a method for enhancing speech or reducing noise 3 for CNN-based single-channel telephone signals, in the category of mask-based methods. Generally, the present invention consists of estimating a mask (or filter) which modifies the spectrum of the observed speech signal in order to generate an enhanced version thereof. This takes advantage of the framework of the gain method, but replaces the intermediate estimation blocks of SNR a priori, SNR a posteriori, estimation of the noise spectrum and estimation of the clean speech spectrum, motivated by the tendency thereof to introduce errors.

Instead, the method of the present invention employs a CNN-based estimate capable of performing the analysis of each time-frequency segment of the signal in a non-recursive manner, thereby preventing the propagation of errors typical of this type of estimate. Specifically, the CNN is responsible for obtaining a Wiener gain estimate, which is used to generate the enhancement mask or filter. To do so, the CNN implements a regression model which learns the MMSE estimator of the clean speech signal, also known as the Wiener gain estimator. This term is less sensitive to estimation errors than the aforementioned intermediate estimation steps, due to the dynamic range thereof and the operations of the learning method of the CNN. In this manner, the method for enhancing speech ensures that the acoustic quality is not decreased even in speech signals which are not notably affected by noise.

The novelty of the present invention lies in the design of the CNN-based noise reduction method, both due to the essential nature of the method itself, and due to the context of the application thereof. The main novelty of the method consists of the selection of the Wiener gain estimator as an essential element of the method of the present invention, the characteristics of which make it appropriate to be estimated by machine learning approaches, which decreases the sensitivity to estimation errors.

Figure 2:
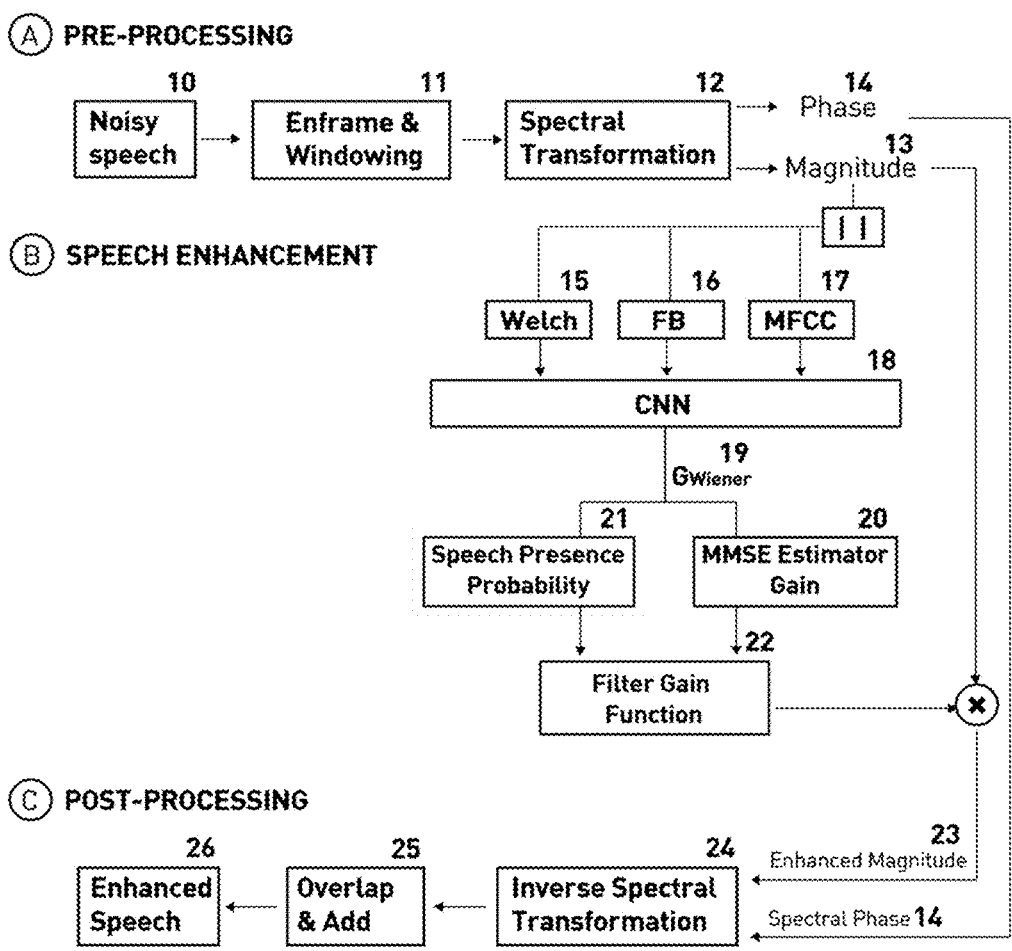
FIG. 2 shows a block diagram of the invention which includes a stage A for pre-processing or parameterization, a stage B for noise reduction wherein the novelty resides and a stage C for post-processing or reconstruction of the speech signal.

FIG. 2 shows a flow chart of the method implemented, formed by three stages of processing. The stage A performs a pre-processing of the noisy speech signal 10 which is responsible for representing it in the time-frequency domain. This begins with the segmentation of the speech signal 10 into short overlapping segments of tens of milliseconds which conserve the quasi-stationary properties of the speech, to which a Hamming, Hanning, or other suitable window is applied in order to prevent distortions 11. Then a transformation is performed on the spectrum-temporal domain 12, which can be implemented starting from a Fourier transform, or another equivalent transformation. Next, the resulting spectrum is divided into magnitude 13 and spectral phase 14. Magnitude 13 is used as an input of noise reduction stage B, while the spectral phase 14 is saved for the reconstruction implemented in stage C.

In noise reduction stage B, the novelty of the proposal is concentrated. This is responsible for generating an enhancement filter with which to compensate for the effects of acoustic noise in the spectral magnitude 13 of the segment under analysis. The gain of said filter 22 depends on the gain function of the MMSE estimator of the clean speech signal 20 and on the speech presence probability 21. In order to obtain these elements, a CNN is used which estimates the Wiener gain 19 starting from learning the structure of the noisy speech, seeing multiple examples of speech signal spectra and the corresponding associated noise spectra separately.

The DNN architecture in this case consists of a Convolutional Neural Network (CNN) 18 with multiple entries which are stacked together in a vector including one or several spectral representations, for example, spectral estimates obtained by means of the Welch's method 15 or another equivalent representation, as well as one or several perceptual representations of the observed speech signal, for example, the Mel scale filter bank (FB) 16, Mel-frequency cepstral coefficients (MFCC) 17, or other equivalent representations. In the present invention, the processing of the convolutional layer is causally configured, i.e., it only makes use of information from the past, which enables them to act in real time. The output of the CNN is an estimate of the Wiener gain 19, which consists of a matrix/vector dependent on the frequency and which varies in time. This matrix/vector is used as the gain of the MMSE estimator of the clean speech signal 20 and as an estimate of the speech presence probability 21. Subsequently, both are used to obtain the function of the speech enhancement filter 22 according to the following definition (I. Cohen and B. Berdugo, "Speech enhancement for non-stationary noise environments" Signal Processing, vol. 81, no. 11, pp. 2403-2418, 2001):

$$G_{filtro}(t, f) = \left[\hat{G}_{Wiener}(t, f)\exp\left(\frac{1}{2}\int_{v(t,f)}^{\infty} \frac{e^{-t}}{t}dt\right)\right]^{p(t,f)} G_{min}^{1-p(t,f)}$$

wherein t is the time segment, f is the frequency bin, $\hat{G}_{Wiener}$=DNN($x_t$, $x_{t-1}$, ...) with $x_t$ the vector of spectral and perceptual parameters at the instant in time t, $G_{min}$ is a constant, p(t, f) is the speech presence probability and $$v(t, f) = \frac{\hat{G}_{Wiener}}{1 - \hat{G}_{Wiener}}.$$

The function of the speech enhancement filter is defined with the same mentioned time-frequency resolution based on the Wiener gain and applying a differentiated treatment to the speech and non-speech segments. This criterion is based on considering that the affectation of the acoustic noise manifests itself differently in the speech and non-speech areas. Finally, this filter is responsible for enhancing the spectrum of the speech signal, therefore it is applied to the spectral magnitude 13 which resulted from stage A. Note that the reduction in noise is implemented in a non-recursive manner, for which reason potential errors which are originated for a certain signal segment will not affect subsequent processing stages.

The convolutional neural network of the present invention needs to be trained. In the present case, in the training stage the cost function is the mean squared error between the optimal Wiener estimator and the output of the network:

$$F_{coste} = \frac{1}{T}\sum_{t=1}^{T}\sum_{f=1}^{F}(G_{Wiener}(t, f) - \hat{G}_{Wiener}(t, f))^2.$$

To do so in a supervised manner, $$G_{Wiener}(t, f) = \frac{S_{X(t,f)}}{S_{X(t,f)} + S_{N(t,f)}}$$

is calculated which uses the estimates of the spectral power densities of the clean speech signal $S_{X(t,f)}$ and of the noise $S_{N(t,f)}$ which gave rise to the observed telephone speech signal. This spectrum is estimated according to Welch's method, which performs an average of the M overlapping time segments in order to obtain an estimate with less variance. The neural network is trained with a large number of clean speech signals (hundreds of hours of speech) and the corresponding noise signals thereof. The noise signals used in the training cover a wide range of noisy conditions which could potentially appear in real application scenarios, for example, various types and levels of noise or reverberation. In addition to the actual noise signals, artificial modifications are made to the mixture of speech and noise such that the greatest number of examples seen by the network in the learning stage thereof are covered, for example, scale changes and compression, among others.

Finally, the post-processing stage C ends the noise reduction process, obtaining an enhanced speech signal 26. To do so, it uses the spectral phase 14 which resulted from the pre-processing stage A and the enhanced spectral magnitude 23 resulting from the processing of stage B. Both are inserted into an inverse spectral transformation block 24, using the spectral transformation algorithm corresponding to the one used in stage A. A temporal reconstruction algorithm 25 is then used, which takes into account the overlapping and windowing which was used in the temporal segmentation 11 of stage A. Finally, the enhanced waveform of the speech signal 26 is obtained.

The invention claimed is:

1. A method for enhancing telephone speech signals based on convolutional neural networks, wherein the method comprises:
   extracting, during a pre processing stage, a magnitude and a phase of a spectral representation of a telephone speech signal;
   applying, during a noise reduction stage, the following steps to the magnitude of the spectral representation of the telephone speech signal:
   applying a spectral estimator;
   computing a perceptual representation;
   applying a Convolutional Neural Network which, with a plurality of inputs corresponding to a spectral estimate and the perceptual representation, generates as an output a Wiener gain estimate consisting of a matrix/vector dependent on a frequency and which varies in time;
   using the Wiener gain estimate within an enhancement filter of a function f1:

$$G_{filtro}(t, f) = \left[\hat{G}_{Wiener}(t, f)\exp\left(\frac{1}{2}\int_{v(t,f)}^{\infty}\frac{e^{-t}}{t}dt\right)\right]^{p(t,f)} G_{min}^{1-p(t,f)}$$

wherein t is a time segment, f is a frequency bin, $\hat{G}_{Wiener}$=DNN($x_t$, $x_{t-1}$, . . . ) with $x_t$ as a vector of a plurality of spectral and perceptual parameters, $G_{min}$ is a constant, p(t, f) is a speech presence probability and $$v(t, f) = \frac{\hat{G}_{Wiener}}{1 - \hat{G}_{Wiener}};$$

using the Wiener gain estimate as a probability of a presence of speech;
   applying the function f1 as a speech enhancement filter; and
   merging, during a post processing state, an initial phase with the magnitude enhanced in the noise reduction stage.

2. The method for enhancing telephone speech signals based on convolutional neural networks, according to claim 1, wherein the Convolutional Neural Network is trained with a cost function which is a mean squared error between an optimal Wiener gain estimate and an output of the Convolutional Neural Network defined by:

$$F_{coste} = \frac{1}{T}\sum_{t=1}^{T}\sum_{f=1}^{F}\left(G_{Wiener}(t, f) - \hat{G}_{Wiener}(t, f)\right)^2$$

wherein $$G_{Wiener}(t, f) = \frac{S_{X(t,f)}}{S_{X(t,f)} + S_{N(t,f)}}$$

is obtained in a supervised manner, $S_{X(t,f)}$ and $S_{N(t,f)}$ respectively being a plurality of estimates of a plurality of power spectral densities of a clean speech signal and a noise.

3. The method for enhancing telephone speech signals based on convolutional neural networks, according to claim 1, wherein extracting the magnitude and the phase of the spectral representation of the telephone speech signal further comprises dividing the telephone speech signal into a plurality of overlapping segments of tens of milliseconds to which a Hamming or Hanning window is applied, and subsequently a Fourier transform.

4. The method for enhancing telephone speech signals based on convolutional neural networks, according to claim 1, wherein the spectral estimator is calculated by Welch's method.

5. The method for enhancing telephone speech signals based on convolutional neural networks, according to claim 1, wherein the perceptual representation is calculated by applying a Mel scale filter bank.

6. The method for enhancing telephone speech signals based on convolutional neural networks, according to claim 1, wherein the perceptual representation is performed with Mel-frequency cepstral coefficients "MFCC".

7. The method for enhancing telephone speech signals based on convolutional neural networks, according to claim 6, wherein merging the initial phase with the magnitude enhanced in the noise reduction stage further comprises applying an inverse Fourier transform, and subsequently, a temporal reconstruction algorithm.

8. The method for enhancing telephone speech signals based on convolutional neural networks, according to claim 2, wherein the Convolutional Neural Network comprises at least one convolutional layer which is causal and has low latency.

9. The method for enhancing telephone speech signals based on convolutional neural networks, according to claim 1, further comprising objectively evaluating, during the pre-processing stage, a quality of the telephone speech signal by using an acoustic quality measure selected from SNR, distortion and POLQA.

* * * * *

UNITED STATES PATENT AND TRADEMARK OFFICE
CERTIFICATE OF CORRECTION

PATENT NO. : 11,804,234 B2
APPLICATION NO. : 17/124794
DATED : October 31, 2023
INVENTOR(S) : Javier Gallart Mauri et al.

It is certified that error appears in the above-identified patent and that said Letters Patent is hereby corrected as shown below:

On the Title Page

Column 1, Item (73) Assignee, Line 3, delete "Sargossa" and insert -- Saragossa --

In the Claims

Column 9, Line 54, Claim 1, after "speech;" insert -- and --

Signed and Sealed this
Ninth Day of January, 2024

Katherine Kelly Vidal
*Director of the United States Patent and Trademark Office*